United States Patent [19]

Wohlrab

[11] 4,017,178
[45] Apr. 12, 1977

[54] APPARATUS FOR DETECTING A MALFUNCTION IN A COLOR CONNECTING LIGHT VALVE OF A FILM PRINTER

[75] Inventor: Hans Chr. Wohlrab, North Hollywood, Calif.

[73] Assignee: PSC Technology, Inc., Glendale, Calif.

[22] Filed: Mar. 14, 1975

[21] Appl. No.: 558,537

[52] U.S. Cl. ................................. 355/38; 355/88
[51] Int. Cl.² ...................................... G03B 27/78
[58] Field of Search ................. 355/32, 35, 36, 38, 355/68, 81, 88

[56] References Cited

UNITED STATES PATENTS

| | | | |
|---|---|---|---|
| 3,502,409 | 3/1970 | Balint et al. | 355/36 |
| 3,552,852 | 1/1971 | Stemke et al. | 355/35 |
| 3,575,702 | 4/1971 | Huber | 355/68 X |
| 3,602,579 | 8/1971 | Silvertooth | 355/36 X |
| 3,698,815 | 10/1972 | Thomas | 355/68 X |
| 3,716,299 | 2/1973 | Balint | 355/88 X |

Primary Examiner—Fred L. Braun
Attorney, Agent, or Firm—Christie, Parker & Hale

[57] ABSTRACT

A light valve of a film printer has vanes set by the expansion of a plurality of slides parallel to a first axis. The slides are individually actuatable parallel to a second axis transverse to the first axis in a path between a first position and a second position so that the slides expand parallel to the first axis an amount depending upon the combination of slides actuated into the second position and are movable as a unit parallel to the first axis responsive to a trim adjusting knob. A carriage mounted on the light valve is movable parallel to the first axis. A sensor individual to each slide, preferably a light source and a light detector, intersects the path of such slide to indicate whether it is in the first or second position. The carriage is coupled to the trim adjusting knob so the carriage moves parallel to the first axis as the slides are moved as a unit responsive to the trim adjusting knob, to maintain the slides between the respective sensors. Preferably, the sensors and a slide register that actuates the respective slides are coupled to a comparator to stop film transport when the indications of the sensors and the contents of the slide register do not match.

15 Claims, 5 Drawing Figures

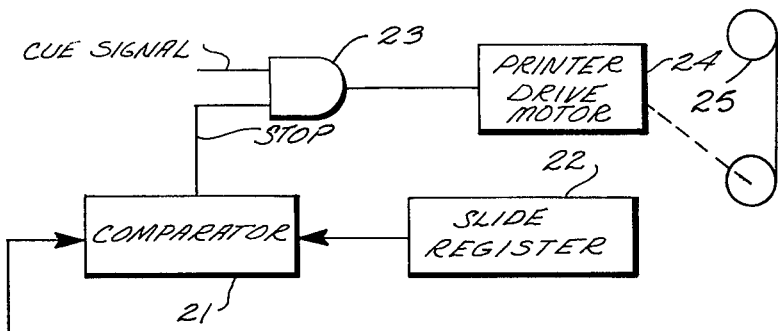
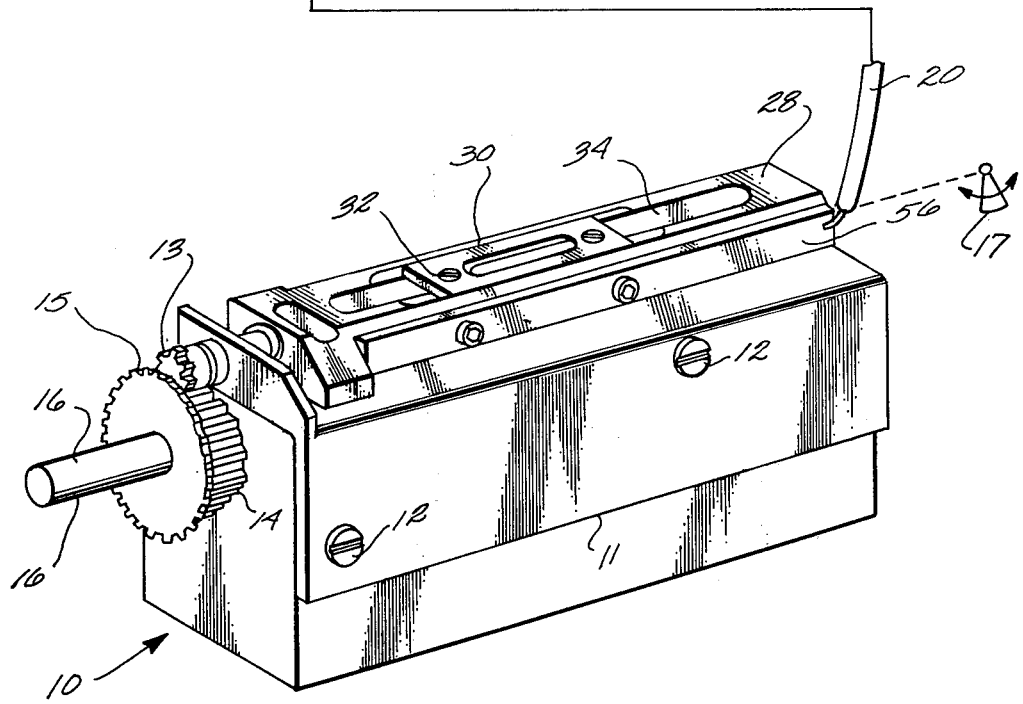
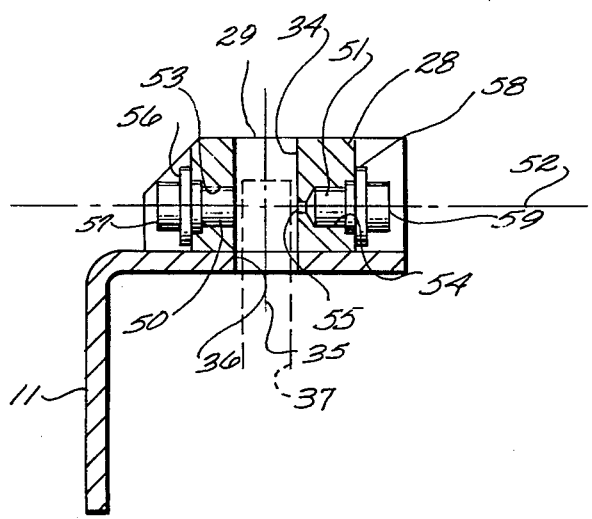
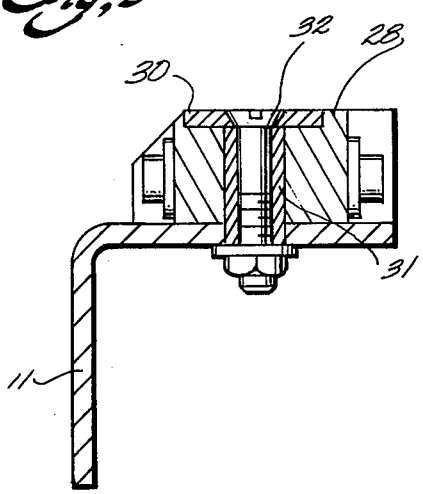

APPARATUS FOR DETECTING A MALFUNCTION IN A COLOR CONNECTING LIGHT VALVE OF A FILM PRINTER

BACKGROUND OF THE INVENTION

This invention relates to color connecting photographic film printers and, more particularly, to improved apparatus for detecting malfunctions of the light valves that execute color corrections in a film printer.

Film printers are employed to expose a reel of raw film to the frames of photographic images on a reel of master film while the master film and raw film are transported together. Light control operations are commonly executed during the exposure process in high quality film copying operations. In particular, red, green, and blue color corrections are made by so-called light valves at the beginning of each scene of the master film to compensate for the different lighting conditions under which the master film was produced and different film characteristics. Typically, light from a light source is split into the component colors blue, green, and red by dichroic mirrors. The three light components are transmitted through respective light valves to adjust the proportional intensity of each color component. The adjusted color components are recombined and the recombined color adjusted light is projected through an exposure aperture onto the film. Each light valve includes a bar type adder unit having a plurality of solenoid actuated slides. Binary signals representing the color correction are coupled to the slide actuating solenoids, thereby causing the adder unit to expand linearly by an amount depending upon which of the slide actuating solenoids have been actuated. This linear expansion is converted to an angular rotation by a vane memory. The angular position of the vane memory is then sampled by energizing a vane solenoid, which is turn moves vanes in the light valve into the path of the particular color component, i.e., red, green, or blue, an amount determined by the angular position of the vane memory. The slides are also movable as a unit when a trim adjusting knob is turned. (This permits an initial adjustment to be made depending upon the film characteristics.)

Balint et al U.S. Pat. No. 3,502,409, which issued Mar. 24, 1970, discloses a malfunction detecting system for film printers. Specifically, the contacts of a reed switch associated with each side are opened and closed responsive to a pivotable shield member that lies in the path of the associated slide. Thus, the position of each slide is represented by the state of the corresponding reed switch, i.e., open or closed. The reed switches are mounted on a stationary block and therefore do not move with the slides when the trim adjusting knob is turned. To detect a malfunction, the states of the reed switches are compared with the states of the stages of a slide register in the form of memory relays. When the comparison indicates that the reed switches do not match the contents of the slide register, an error indicator is actuated.

SUMMARY OF THE INVENTION

According to the invention, improved apparatus for detecting a malfunction in a color correcting light valve of a film printer comprises a carriage movable parallel to the axis along which the slides of the light valve expand, sensing means individual to the slides so mounted on the carriage as to intersect the path of each side to indicate whether the slide is actuated, and means for coupling the carriage to the trim adjusting knob of the light valve to move the carriage parallel to the axis of slide expansion while the slides are moved as a unit responsive to the trim adjusting knob. As a result, the sensing means remain aligned with the respective slides in the course of the trim adjustment.

A feature of the invention is sensing means that take the form of a light source and a light detector aligned with one another and so positioned on the carriage that light passes from the source to the detector when the corresponding slide is in one position and the passage of light from the source to the detector is blocked by the corresponding slide in the other position. Such sensing means are reliable and fast acting because they have no moving parts Another feature of the invention is the stopping of the film transport motor when the sensing means fail to match the contents of the slide register. Thus, the film printer is automatically shut down after a malfunction is detected, so copying of the film does not continue with a malfunctioning light valve.

BRIEF DESCRIPTION OF THE DRAWINGS

The features of a specific embodiment of the best mode contemplated for carrying out the invention are illustrated in the drawings, in which:

FIG. 1 is a side view of a light valve and apparatus for detecting a malfunction by employing the principles of the invention;

FIGS. 4 and 5 are sectional views of the malfunction detectng apparatus of FIG. 1 taken through the planes indicated in FIG. 2.

DETAILED DESCRIPTION OF THE SPECIFIC EMBODIMENT

Figure 2:
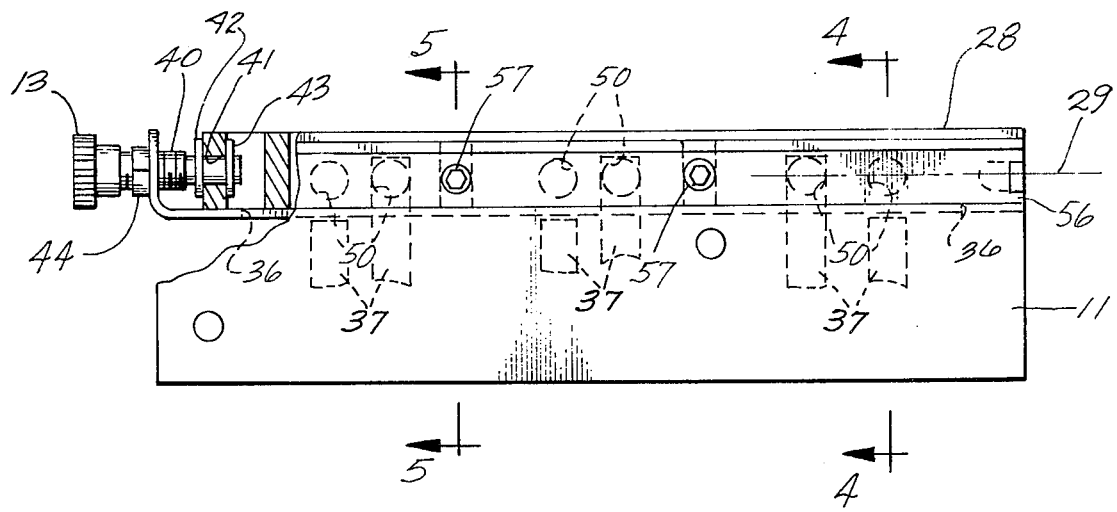
FIG. 2 is a side view of the malfunction detecting apparatus of FIG. 1.

In FIG. 1, a light valve 10 is constructed in the same manner as the light valve described in Balint et al U.S. Pat. No. 3,502,409, the disclosure of which is incorporated herein by reference. Light valve 10 has a plurality of individually actuatable slides and a vane designated 17 in FIG. 1, which is coupled to the slides so the movement of the vane into the path of the primary color beam is proportional to the expansion of the slides. Apparatus for detecting a malfunction of the slides of light valve 10 includes an L-shaped mounting bracket 11 secured to light valve 10 by fasteners 12 and a spur gear 13. Spur gear 13 engages and is axially movable across the periphery of a spur gear 14, which is part of the interconnection from a trim adjusting knob, not shown, to the slides of light valve 10. Spur gear 14 and a larger spur gear 15 are mounted on a rotatable shaft 16. When the trim adjusting knob is turned, its rotation is transferred to a spur gear, not shown, which engages spur gear 15 to rotate shaft 16. With reference to FIG. 5 of the Balint et al patent, a spur gear is mounted on rotatable threaded shaft 102. This spur gear engages and is axially movable across the periphery of spur gear 14. Thus, as shaft 16 rotates, it transmits to the slides as a unit a translational movement parallel to the axis of shaft 16, which is parallel to the direction of expansion of the slides.

As described in detail below, signals representing the position of the respective slides are coupled by a cable 20 to a comparator 21. Signals representing the states of the stages of slide register 22, which could be memory relays 141 through 146 in FIG. 8 of the reference Balint et al patent, are also coupled to comparator 21. When the signals from the malfunction detecting apparatus fail to match the signals from slide register 22, comparator 21 generates a STOP signal that is transmitted through an AND gate 23 to a printer drive motor 24, which is coupled to a film transport mechanism 25, to stop film transport and shut down operation of the film printer, upon the occurrence of the next cue signal, which is also coupled to the input of AND gate 23. Thus, film transport continues to the end of the scene being color corrected prior to the malfunction and then stops when the next scene is about to be color corrected by the malfunctioning light valve. If one does not want to save the scene being color corrected prior to the malfunction, AND gate 23 could be eliminated so film transport stops immediately after a malfunction is detected.

Figure 3:
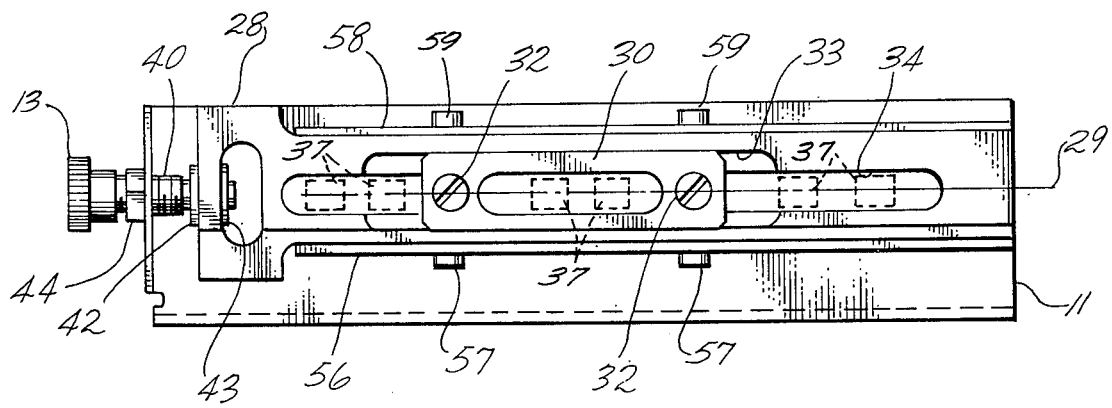
FIG. 3 is a top view of the malfunction detecting apparatus of FIG. 1.

Reference is made to my copending application Ser. No. 558,536, filed on even date herewith, entitled "APPARATUS FOR EXECUTING LIGHT CONTROL OPERATIONS IN A BIDIRECTIONAL FILM PRINTER," assigned to the same assignee as the present application, the disclosure of which is incorporated herein by reference. The STOP signal generated by comparator 21 herein could be coupled through AND gate 23 herein and then through OR gate 95 therein (FIG. 3) to printer drive motor 24 (FIG. 1). The cue signal from comparator 41 therein could be coupled by lead 90 therein to the input of AND gate 23 herein.

Reference is made to FIGS. 2 through 5 for a description of the malfunctioning detecting apparatus. A carriage 28 is mounted on bracket 11 to slide along an axis 29, which is parallel to the direction of expansion of the slides of light valve 10. The slides of light valve 10 are represented by dashed lines and designated 37 in FIGS. 2, 3, and 4. With reference to FIG. 5 of the Balint et al patent, carriage 28 slides back and forth horizontally in the same manner as unlatching bar 88 therein. A stationary carriage guiding plate 30 is held in spaced relationship from mounting bracket 11 by spacers 31, and secured to mounting bracket 11 by fasteners 32. As carriage 28 slides back and forth along axis 29, guiding plate 30 rides in an elongated recess 33 on the surface of carriage 28 and spacers 31 ride in an elongated slot 34 passing through carriage 28 parallel to an axis 35 (FIG. 4). Axis 35, in turn, is parallel to the direction of movement of the individual slides of light valve 10 responsive to their actuating solenoids. (With reference to FIG. 5 of the Balint et al patent, such slide movement is up and down in a vertical direction. When a slide is moved downwardly by actuating its solenoid, the slide passes through a slot 36 in bracket 11 into slot 34.) Spur gear 13 is secured to a threaded and rotatable shaft 40. The end of shaft 40 passes through a hole 41 in carriage 28. Snap rings 42 and 43 on either side of hole 41 secure the end of shaft 40 to carriage 28. A nut 44 having threads that mate with the threads of shaft 40 is clinched to bracket 11 in the path of shaft 40. As spur gear 13 rotates, shaft 40 rotates about and translates along axis 29 to slide carriage 28.

A light emitting diode 50 and a photo resistor 51 corresponding to each slide of light valve 10 are positioned on carriage 28 so light from light emiting diode 50 travels along an axis 52 to photo resistor 51. Axis 52 lies in the path of movement of the corresponding slide. When such light reaches photo resistor 51, it has a low resistance; when such light does not reach photo resistor 51, it has a high resistance. Axes 29, 35, and 52 are mutually perpendicular. Light emitting diode 50 and photo resistor 51 reside in bores 53 and 54, respectively, drilled in alignment with axis 52 on opposite sides of slot 34. Bore 54 does not extend through to the surface of slot 34. The light from light emitting diode 50 passes through a small hole 55 to reach photo resistor 51. When the corresponding slide is in one position, light passes from light emitting diode 50 to photo resistor 51 to provide a low resistance in an electrical circuit, not shown, and generate a signal of one binary value, e.g., 0. When the corresponding slide is in the other position, it blocks the passage of light from light emitting diode 50 to photo resistor 51 to provide a high resistance in the electrical circuit and generate a signal of the other binary value, e.g., 1. (With reference to FIG. 5 of the Balint et al patent, slide 70 therein is in the position in which it interrupts the passage of light from the light emitting diode to the photo resistor, and slides 60 through 68 therein are in the position in which light passes from the light emitting diode to the photo resistor.)

The disclosed embodiment is designed for a light valve having six slides. Accordingly, there are six pairs of light emitting diodes 50 and photo resistors 51; each with an axis 52 positioned to intersect the path of the corresponding slide. The distribution of light emitting diodes 50 along axis 29 is illustrated in FIG. 2.

Light emitting diodes 50 are mounted on a printed circuit board 56, and the electrical connections to cable 20 (FIG. 1) are made prior to placement of light emitting diodes 50 in their respective bores 53. Then, printed circuit board 56 is secured to the side surface of carriage 28 by fasteners 57 such that light emitting diodes 50 lie in their respective bores 53. Similarly, photo resistors 51 are mounted on a printed circuit board 58 and the electrical connections to cable 20 are made prior to placement of photo resistors 51 in their respective bores 54. Then, printed circuit board 58 is secured to the side surface of carriage 28 by fasteners 59 such that photo resistors 51 lie in their respective bores 54.

When the trim adjusting knob of light valve 10 is turned to make a trim adjustment of the slides as a unit in the direction of slide expansion, gear 14 rotates, thereby rotating and moving gear 13 axially along the periphery of gear 14. This in turn repositions axes 52 of the respective pairs of light emitting diodes 50 and photo resistors 51 so they remain in the path of movement of the respective slides of light valve 10.

The described embodiment of the invention is only considered to be preferred and illustrative of the inventive concept; the scope of the invention is not to be restricted to such embodiment. Various and numerous other arrangements may be devised by one skilled in the art without departing from the spirit and scope of this invention.

What is claimed is:
1. In a light valve for a color correcting film printer having light vane means set by the expansion of a plurality of slides parallel to a first axis, the slides being individually actuatable parallel to a second axis transverse to the first axis in a path between a first position and a second position so the slides expand parallel to the first axis an amount depending upon the combination of slides actuated into the second position and being movable as a unit parallel to the first axis responsive to trim adjusting means, apparatus for detecting a malfunction comprising:

a carriage movable parallel to the first axis;

sensing means on the carriage intersecting the path of each slide to indicate whether the slide is in the first position or the second position; and means for coupling the carriage to the trim adjusting means to move the carriage parallel to the first axis as the slides are moved parallel to the first axis as a unit to maintain the slides between the sensing means.

2. The apparatus of claim 1, additionally comprising a guiding plate fixed to the bracket in spaced relationship therefrom in alignment with the first axis such that the carriage lies between the guiding plate and the bracket and a recess in the carriage in which the guiding plate rides as the carriage moves.

3. The apparatus of claim 2, in which the carriage has an elongated slot into which the slides move in one position and the guiding plate is attached to the bracket by spacers that ride in the slot as the carriage moves.

4. The apparatus of claim 1, additionally comprising a mounting bracket, the coupling means comprising:

a rotatable threaded shaft aligned with the first axis;

means fixed to the bracket for forming a threaded connection with the shaft;

means for fixing one end of the shaft to the carriage; and a gear mounted on the other end of the shaft to rotate and translate responsive to the trim adjusting means.

5. The apparatus of claim 1, in which the sensing means comprises a light source and a light detector corresponding to each slide aligned with one another and so positioned on the carriage that light passes from the source to the detector when the corresponding slide is in one position and the passage of light from the source to the detector is blocked by the corresponding slide in the other position.

6. The apparatus of claim 5, in which the carriage has an elongated slot into which the slides move in the other position, the light source corresponding to each slide being mounted on one side of the slot and the light detector corresponding to each slide being mounted on the other side of the slot.

7. The apparatus of claim 5, additionally comprising a mounting bracket, the coupling means comprising:

a rotatable threaded shaft aligned with the first axis;

means fixed to the bracket for forming a threaded connection with the shaft;

means for fixing one end of the shaft to the carriage; and a gear mounted on the other end of the shaft to rotate and translate responsive to the trim adjusting means.

8. The apparatus of claim 7, in which the carriage has an elongated slot into which the slides move in the other position, the light source corresponding to each slide being mounted on one side of the slot and the light detector corresponding to each slide being mounted on the other side of the slot.

9. The apparatus of claim 8, additionally comprising a guiding plate fixed to the bracket in spaced relationship therefrom in alignment with the first axis such that the carriage lies between the guiding plate and the bracket and a recess in the carriage, in which the guiding plate rides as the carriage moves.

10. The apparatus of claim 9, in which the guiding plate is attached to the bracket by spacers that ride in the slot as the carriage moves.

11. A film printer comprising:

means for transporting a master film and a raw film during a printing operation;

a plurality of light valves for color correcting the film during the printing operation, each light valve having a plurality of slides individually actuatable parallel to an actuating axis between a first position and a second position to expand the slides along an axis of expansion perpendicular to the actuating axis an amount depending upon the combination of slides actuated into the second position;

means for storing electrical signals representing the slides to be actuated;

means for actuating the slides responsive to the storing means;

light vane means set by the expansion of the slides;

sensing means intersecting the path of each slide to indicate whether the slide is in the first or second position, the sensing means comprising a light source and a light detector corresponding to each slide aligned with one another and so positioned that light passes from the source to the detector when the corresponding slide is in one position and the passage of light from the source to the detector is blocked by the corresponding slide when in the other position;

means for comparing the signals in the storing means with the indications of the sensing means;

means responsive to the comparing means for stopping the transporting means, thereby terminating the printing operation, when the indications of the sensing means fail to match the signals in the storing means;

trim adjusting means for moving the slides as a unit parallel to the axis of expansion;

a carriage movable parallel to the actuating axis, the light sources and detectors being mounted on the carriage; and means for coupling the carriage to the trim adjusting means to move the carriage parallel to the axis of expansion as the slides are moved.

12. The printer of claim 11, in which the light vane means are set by cue signals as the scene changes in the master film and the stopping means is also responsive to the cue signal following the failure to match so the transporting means stops upon the scene change following the failure to match.

13. In a film printer, the combination comprising:

a plurality of light valves for color correcting the film during the printing operation, each light valve having a plurality of slides individually actuatable parallel to an actuating axis between a first position and a second position to expand the slides along an axis of expansion perpendicular to the actuating axis an amount depending upon the combination of slides actuated into the second position;

means for storing electrical signals representing the slides to be actuated;

means for actuating the slides responsive to the storing means;

light vane means individual to each light valve set by the expansion of the slides;

a light source and a light detector corresponding to each slide aligned with one another and so positioned that light passes from the source to the detector when the corresponding side is in one position and the passage of light from the source to the detector is blocked by the corresponding slide in the other position;

means responsive to the light detectors for generating an error signal when the positions of the slides fail to match the signals in the storing means;

trim adjusting means for moving the slides as a unit parallel to the axis of expansion;

a carriage movable parallel to the actuating axis, the light sources and detectors being mounted on the carriage; and means for coupling the carriage to the trim adjusting means to move the carriage parallel to the axis of expansion as the slides are moved.

14. The printer of claim 13, additionally comprising means for transporting a master film and a raw film during a printing operation and means for stopping the transporting means responsive to the error signal.

15. The printer of claim 14, in which the light vane means are set by cue signals as the scene changes in the master film and the stopping means is also responsive to the cue signal following the failure to match so the transporting means stops upon the scene change following the failure to match.

* * * * *